United States Patent Office  3,654,305
Patented Apr. 4, 1972

1

3,654,305
5-AZASPIRO[2.4]HEPTANES
Victor Frederick German, Richmond, Va., assignor to
A. H. Robins Company, Incorporated, Richmond, Va.
No Drawing. Filed Jan. 26, 1970, Ser. No. 5,896
Int. Cl. C07d 27/04
U.S. Cl. 260—326.5 R                           7 Claims

ABSTRACT OF THE DISCLOSURE 5-azaspiro[2.4]heptanes prepare by metal hydride reduction of 5-azaspiro[2.4]heptane-4,6-diones having antidepressant activity are described.

---

The present invention relates to 5-azaspiro[2.4]heptane compounds having pharmacological activity. In particular, the invention relates to 5-azaspiro[2.4]heptane compounds which are substituted at the 1 and 5 position, compositions thereof, and methods of making and using same.

The product compounds of the invention are represented by the following structural formula:

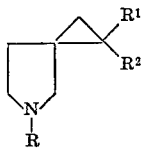

Formula I wherein:
R is selected from hydrogen, lower-alkyl, hydroxylower-alkyl, phenyl, monosubsituted phenyl and phenylalkyl,
R¹ is selected from hydrogen, phenyl and monosubstituted phenyl,
R² is selected from phenyl and monosubsituted phenyl, wherein said monosubstitutent is selected from lower alkoxy, lower alkyl, trifluoromethyl and halogen radicals, and the non-toxic pharmaceutically acceptable acid addition and quaternary ammonium salts thereof.

The compounds falling within the general Formula I may exist in more than one form due to the possibility of stereoisomerism resulting from at least one center of asymmetry. It is to be understood that the forgeoing Formula I includes the possible racemates as well as the individual optically active forms.

The product compounds of the invention are antidepressants. The antidepressant activity was shown by inhibition of the depressant state which is induced by intravenous administration of 2-oxo-3-isobutyl-9,10-dimethoxy-1,2,3,4,6,7 - hexahydro-11bH-benzo[a]quinolizine (tetrabenazine) in mice [Englehardt, E. L. et al., J. Med. Chem. 11(2): 325(1968)]. Among the novel compounds of the present invention which have been shown to block the depressant activity of tetrabenazine when administered intraperitoneally to mice, the compounds of Examples 1, 2, and 3, 1,1-diphenyl-5-azaspiro[2.4]heptane, 5-methyl-1,1-dipehnyl-5-azaspiro[2.4]heptane and 5 - ethyl-1,1-diphenyl-5-azaspiro[2.4]heptane are preferred. The $ED_{50}$'s of Examples 1, 2, and 3 are 5, 2.3, and 3.4 mg./kg. respectively.

It is, therefore, an object of the present invention to provide novel 5-azaspiro[2.4]heptanes having a high degree of antidepressant activity. Another object is to provide methods for producing the novel compounds, pharmaceutical compositions containing said novel compounds as active ingredient, and methods for the utilization thereof. Additional objects will be apparent to one skilled in the art and still other objects will become apparent hereinafter.

In the definition of the symbols in the foregoing Formula I, and where they appear eslewhere throughout the specification and claims thereof, the terms used herein have the following significance.

The term "lower alkyl" includes straight and branched chain radicals of up to eight carbon atoms inclusive and is exemplified by such groups as methyl, ethyl, propyl, isopropyl, butyl, isobutyl, tertiary butyl, amyl, isoamyl, hexyl, heptyl, octyl and the like. The term "lower alkoxy" has the formula —O-lower alkyl.

When halogen is referred to herein, preferably but not necessarily a halogen of atomic weight in excess of eighteen but not greater than eighty is employed.

The term "phenyl" includes the phenyl radical and the substituted phenyl radical. Among the suitable substituted phenyl radicals are those which are substituted by any radical or radicals which are not reactive or otherwise interfering under the conditions of reaction in preparing the desired compound, such radicals including lower alkoxy, lower alkyl, trifluoromethyl, halo and the like. The substituted phenyl radicals have preferably one to three substituents such as those given above and, furthermore, these substituents can be in various available positions of the phenyl nucleus and, when more than one substituent is present, can be the same or different and can be in various position combinations relative to each other. The lower alkoxy and lower alkyl substituents each have preferably from one to four carbon atoms which can be arranged as straight and branched chains. A total of nine carbon atoms in all ring substituents, making a total of fifteen carbon atoms in the radical, is the preferred maximum.

Included in the term "phenylalkyl" are groups such as benzyl, phenethyl, methylbenzyl, phenpropyl and the like.

The compounds of the invention are most conveniently employed in the form of non-toxic acid addition salts. Such salts have improved water solubility over the free base. Although the non-toxic salts are preferred, any salt may be prepared for use as a chemical intermediate, as in the preparation of another acid addition salt suitable for administration to an animal body for the desired physiological effect thereof. Appropriate acid addition salts are those derived from mineral acids such as hydrochloric, hydrobromic, sulfuric, and phosphoric; and organic acids such as acetic, citric, lactic, maleic, oxalic, fumaric and tartaric. The preferred acid addition salt is the hydrochloride. The acid addition salts of the product compounds are conventionally prepared by reaction of the basic compounds with the acid, either or both of which may be in the form of ether, alcohol, or acetone solutions.

The quaternary ammonium salts are prepared by reaction of the free base with the selected acid ester, e.g., an alkyl, cycloalkyl or aralkyl halide, preferably in the presence of an organic solvent inert to the reactants and reaction products under the conditions of the reaction.

The novel compounds of the invention are prepared in the following manner. 5-azaspiro[2.4]heptane-4,6-diones of Formula II

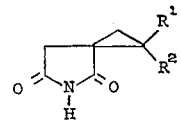

wherein R, R¹, and R² are as defined above are reduced by metal hydrides to the novel 5-azaspiro[2.4]heptanes of Formula I. The 5-azaspiro[2.4]heptane-4,6-diones of Formula II are prepared as described in copending application Ser. No. 5,904 filed on even date herewith.

Generally speaking, the reduction of the 5-azaspiro[2.4]heptane-4,6-diones of Formula II by a metal hydride can be carried out in various ways including (1) the use of a Soxhlet extractor, (2) addition of the metal hydride as a solid, as a suspension in a solvent, or as a solution to a stirred suspension of the imide, or (3) when applicable, combining the imide and metal hydride together in a suitable solvent. Among the solvents which can be used are ether, toluene, benzene and the like. The reduction time varies from a period of from about one hour to about 74 hours depending on which of the methods described hereinabove can be used and the solubility of the imide in the selected solvent. The longest reduction times are generally those when the imide to be reduced has a low degree of solubility in the available solvents and is reached by procedure (1).

The reductions are preferably carried out at the reflux temperatures of the solvent employed and the course of the reduction is followed by thin layer chromatography. Isolation of the reduced material is achieved by careful decomposition of the reduction complex and any excess metal hydride using a saturated aqueous solution of an alkali metal or alkaline earth salt, separation of the organic layer and evaporation of the organic solvent. The crude residual basic material which may be an oil or solid material is purified by crystallization from a suitable solvent or it is converted to an acid addition salt which is further purified by recrystallization. Among the metal hydrides which can be used as reducing agents, lithium aluminum hydride and diisobutyl aluminum hydride are preferred.

Among the novel compounds of the present invention prepared as described above and embraced by Formula I, the compound of Example 1 described hereinafter, 1,1-diphenyl-5-azaspiro[2.4]heptane, is especially preferred for its antidepressant activity and as an intermediate for the preparation of other novel and therapeutically active compounds.

The following examples are given by way of illustration only and are not to be construed as limiting.

EXAMPLE 1

1,1-diphenyl-5-azaspiro[2,4]heptane hydrochloride hemihydride

A 500 ml. round bottom flask containing a suspension of 4.8 g. (0.126 mole) of lithium aluminum hydride in 300 ml. of ether was equipped with a Soxhlet extractor containing 10.0 g. (0.036 mole) of 1,1-diphenyl-5-azaspiro[2.4]heptane-4,6-dione. The suspension was refluxed until all of the material in the extractor had been extracted (72 hours). Refluxing was continued several hours, the reaction mixture was cooled and the excess aluminum hydride was decomposed with a saturated magnesium sulfate solution. The insoluble salts were filtered off and washed thoroughly with hot ether. The combined ether filtrates were dried over sodium sulfate, filtered and concentrated to an oil. The crude basic oil was converted to the hydrochloride salt which was crystallized from isopropanol to give 5 g. (49%) of product which melted at 222–223° C.

*Analysis.*—Calculated for $C_{36}H_{42}Cl_2N_2O$ (percent): C, 73.58; H, 7.20; N, 4.72. Found (percent): C, 73.78; H, 7.02; N, 4.77.

EXAMPLE 2

5-methyl-1,1-diphenyl-5-azaspiro[2.4]heptane hydrochloride

In a similar manner as described in Example 1, 6.0 g. (0.021 mole) of 5-methyl-1,1-diphenyl-5-azaspiro[2.4]heptane-4,6-dione was reduced using 3.0 g. (0.079 mole) of lithium aluminum hydride. The crude product was converted to the hydrochloride salt and crystallized from isopropanol-isopropyl ether. Recrystallization from ethyl acetate-methanol gave 4.9 g. (78% yield) of product which melted at 258–260° C.

*Analysis.*—Calculated for $C_{19}H_{22}NCl$ (percent): C, 76.10; H, 7.40; N, 4.67. Found (percent): C, 75.89; H, 7.36; N, 4.73.

EXAMPLE 3

5-ethyl-1,1-diphenyl-5-azaspiro[2.4]heptane hydrochloride

In a similar manner as described in Example 1, 6.2 g. (0.02 mole) of 5-ethyl-1,1-diphenyl-5-azaspiro[2.4]heptane-4,6-dione was reduced using 3.0 g. (0.079 mole) of lithium aluminum hydride. The crude viscous oil was converted to the hydrochloride salt and crystallized from isopropanol-isopropyl ether to give 4.9 g. (78% yield) of product which melted at 224–227° C.

*Analysis.*—Calculated for $C_{20}H_{24}NCl$ (percent): C, 76.53; H, 7.71; N, 4.46. Found (percent): C, 76.17; H, 7.89; N, 4.56.

EXAMPLE 4

5-ethyl-1,1-diphenyl-5-azaspiro[2.4]heptane ethobromide 5-ethyl-1,1-diphenyl-5-azaspiro[2.4]heptane (6.0 g.; 0.022 mole) was dissolved in methyl isobutyl ketone and the solution was treated with 4 g. (0.037 mole) of ethyl bromide. The mixture stood at room temperature one week; the crystalline quaternary salt was collected and recrystallized from methyl isobutyl ketone to give 3.1 g. (40% yield) of the quaternary salt which melted at 255.5–257° C. with decomposition.

*Analysis.*—Calculated for $C_{22}H_{28}NBr$ (percent): C, 68.39; H, 7.30; N, 3.63. Found (percent): C, 68.09; H, 7.30; N, 3.58.

EXAMPLE 5

5-phenyl-1,1-diphenyl-5-azaspiro[2.4]heptane

To a stirred slurry of ether and 1.2 g. (0.032 moles) of lithium aluminum hydride was added in one portion 6.0 g. (0.017 mole) of 5-phenyl-1,1-diphenyl-5-azaspiro[2.4]heptane-4,6-dione. The slurry was refluxed three hours and cooled. The excess hydride was decomposed by dropwise addition of a saturated aqueous sodium sulfate solution. The insoluble salts were filtered off and washed with ether. The combined ether fractions were dried over sodium sulfate and concentrated to a solid. The solid residue was recrystallized from 95% ethanol to give 5 g. (91%) of the desired product which melted at 120–122° C.

*Analysis.*—Calculated for $C_{24}H_{23}N$ (percent): C, 88.56; H, 7.12; N, 4.31. Found (percent): C, 88.34; H, 7.11; N, 4.32.

EXAMPLE 6

5-benzyl-1,1-diphenyl-5-azaspiro[2.4]heptane maleate

Using the procedure of Example 1, 4.3 g. (0.017 mole) of 5-benzyl-1,1-diphenyl-5-azaspiro[2.4]heptane-4,6-dione was reduced using 1.6 g. (0.042 mole) of lithium aluminum hydride. The hydride suspension was refluxed 8 hours, cooled and worked up in the usual manner. The residual oil was converted to the maleate salt which was crystallized from isopropanol; the maleate salt weighed 6.0 g. (78% yield) and melted at 180–183° C.

*Analysis.*—Calculated for $C_{29}H_{29}NO_4$ (percent): C, 76.46; H, 6.42; N, 3.07. Found (percent): C, 76.56; H, 6.39; N, 3.06.

EXAMPLE 7

5-(2-hydroxyethyl)-1,1-diphenyl-5-azaspiro[2.4]heptane hydrochloride

Ten grams (0.029 mole) of 5-(2-hydroxyethyl)-1,1-diphenyl-5-azaspiro[2.4]heptane-4,6-dione was added in one portion to a stirred slurry of 4.0 g. of lithium aluminum hydride and 400 ml. of anhydrous ether. The heterogeneous mixture was refluxed 48 hours, cooled, the complex decomposed by careful addition of saturated aqueous sodium sulfate solution and the decomposed mixture filtered free of insoluble salts. The insoluble salts were washed thoroughly with ether. The combined ether extracts were acid-base extracted, the basic fraction dried over sodium sulfate and concentrated. The solid residue weighed 6.0 g. (68% yield). The base was converted to the hydrochloride salt which melted at 214–216° C.

*Analysis.*—Calculated for $C_{20}H_{24}NOCl$ (percent): C, 72.82; H, 7.33; N, 4.25. Found (percent): C, 73.17; H, 7.34; N, 4.22.

EXAMPLE 8

When, in the procedure of Example 2, 5-methyl-1,1-diphenyl-5-azaspiro[2.4] heptane-4,6-dione is replaced by an equimolar amount of:

5-propyl-1,1-diphenyl-5-azaspiro[2.4]heptane-4,6-dione,
5-isopropyl-1,1-diphenyl-5-azaspiro[2.4]heptane-4,6-dione,
5-(n-butyl)-1,1-diphenyl-5-azaspiro[2.4]heptane-4,6-dione,
5-isobutyl-1,1-diphenyl-5-azaspiro[2.4]heptane-4,6-dione,
5-(n-amyl)-1,1-diphenyl-5-azaspiro[2.4]-4,6-dione, and
5-(n-hexyl)-1,1-diphenyl-5-azaspiro[2.4]heptane-4,6-dione there are obtained, 5-propyl-1,1-diphenyl-5-azaspiro[2.4]heptane,
5-isopropyl-1,1-diphenyl-5-azaspiro[2.4]heptane,
5-(n-butyl)-1,1-diphenyl-5-azaspiro[2.4]heptane,
5-isobutyl-1,1-diphenyl-5-azaspiro[2.4]heptane,
5-(n-amyl)-1,1-diphenyl-5-azaspiro[2.4]heptane, and
5-(n-hexyl)-1,1-diphenyl-5-azaspiro[2.4]heptane.

EXAMPLE 9

When, in the procedure of Example 5, 5-phenyl-1,1-diphenyl-5-azaspiro[2.4]heptane-4,6-dione is replaced by an equimolar amount of:

5-(p-bromophenyl)-1,1-diphenyl-5-azaspiro[2.4]heptane-4,6-dione,
5-(p-chlorophenyl)-1,1-diphenyl-5-azaspiro[2.4]heptane-4,6-dione,
5-(o-tolyl)-1,1-diphenyl-5-azaspiro[2.4]heptane-4,6-dione,
5-(p-tolyl)-1,1-diphenyl-5-azaspiro[24]heptane-4,6-dione,
5-(o-anisyl)-1,1-diphenyl-5-azaspiro[2.4]heptane-4,6-dione,
5-(p-anisyl)-1,1-diphenyl-5-azaspiro[2.4]heptane-4,6-dione,
5-(p-ethylphenyl-1,1-diphenyl-5-azaspiro[2.4]heptane-4,6-dione, and
5-(m-trifluoromethylphenyl)-1,1-diphenyl-5-azaspiro[2.4]heptane-4,6-dione, there are obtained, 5-(p-bromophenyl)-1,1-diphenyl-5-azaspiro[2.4]heptane,
5-(p-chlorophenyl)-1,1-diphenyl-5-azaspiro[2.4]heptane,
5-(o-tolyl)-1,1-diphenyl-5-azaspiro[2.4]heptane,
5-(p-tolyl)-1,1-diphenyl-5-azaspiro[2.4]heptane,
5-(o-anisyl)-1,1-diphenyl-5-azaspiro[2.4]heptane,
5-(p-anisyl)-1,1-diphenyl-5-azaspiro[2.4]heptane,
5-(p-ethylphenyl)-1,1-diphenyl-5-azaspiro[2.4]heptane, and
5-(m-trifluoromethylphenyl)-1,1-diphenyl-5-azaspiro[2.4]heptane.

EXAMPLE 10

When, in the procedure of Example 1, 1,1-diphenyl-5-azaspiro[2.4]heptane-4,6-dione is replaced by an equimolar amount of:

1-phenyl-1-(p-anisyl)-5-azaspiro[2.4]heptane-4,6-dione,
1-phenyl-1-(o-tolyl)-5-azaspiro[2.4]heptane-4,6-dione,
1-phenyl-1-(p-tolyl)-5-azaspiro[2.4]heptane-4,6-dione,
1-phenyl-1-(p-fluorophenyl)-5-azaspiro[2.4]heptane-4,6-dione,
1-phenyl-1-(p-chlorophenyl)-5-azaspiro[2.4]heptane-4,6-dione,
1,1-di-(p-tolyl)-5-azaspiro[2.4]heptane-4,6-dione,
1,1-di-(p-anisyl)-5-azaspiro[2.4]heptane-4,6-dione, and
1,1-di-(p-chlorophenyl)-5-azaspiro[2.4]heptane-4,6-dione, there are obtained, 1-phenyl-1-(p-anisyl)-5-azaspiro[2.4]heptane,
1-phenyl-1-(o-tolyl)-5-azaspiro[2.4]heptane,
1-phenyl-1-(p-tolyl)-5-azaspiro[2.4]heptane,
1-phenyl-1-(p-fluorophenyl)-5-azaspiro[2.4]heptane,
1-phenyl-1-(p-chlorophenyl)-5-azaspiro[2.4]heptane,
1,1-di-(p-tolyl)-5-azaspiro[2.4]heptane,
1,1-di-(p-anisyl)-5-azaspiro[2.4]heptane, and
1,1-di-(p-chlorophenyl)-5-azaspiro[2.4]heptane.

Effective quantities of any of the foregoing pharmacologically active compounds of Formula I may be administered to a living animal body for therapeutic purposes according to usual modes of administration and in usual forms, such as orally, in solutions, emulsions, suspensions, pills, tablets and capsules, or intramuscularly or parenterally in the form of sterile solutions or suspensions, and intravenously, in some cases also in sterile solutions.

Amphetamines and barbiturates are frequently useful in depression therapy, as well as tranquilizers. In particular, the use of tranquilizing drugs as with sedatives and the amphetamine group have shown valuable results, especially with disturbed and agitated cases of depression. This invention is, therefore, intended to encompass the combined use of the foregoing with the antidepressant compounds hereof, as well as with other drugs used adjunctively in depression control and treatment. Thus, the compounds of this invention may be administered alone or in combination with other pharmacologically effective agents such as psychomotor stimulants, sedatives, tranquilizers and sedative-level dosages of tranquilizers, etc., as well as buffers and usual pharmaceutical carriers or diluents. Examples of some of these drugs are: phenobarbital, sodium phenobarbital, meprobamate, chlordiazepoxide hydrochloride, butaperazine, methamphetamine, amphetamine, dextroamphetamine.

Although very small quantities of the active materials of the present invention are effective when minor therapy is involved or in cases of administration to subjects having a relatively low body weight, unit dosages are usually from five milligrams or above and preferably 25, 50, or 100 milligrams or even higher, depending of course upon the emergency of the situation and the particular result desired. Five to 50 milligrams appears optimum per unit dose, or usual broader ranges appear to be one to 500 milligrams per unit dose. Daily dosages should preferably range from 10 mg. to 100 mg. The active ingredients of the invention may be combined with other pharmacologically active agents as stated above. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages will, of course, be determined according to standard medical principles under the direction of a physician or veterinarian.

The following formulations are representative for all of the pharmacologically active compounds of this invention.

FORMULATIONS (1) *Capsules.*—Capsules of 10 mg., 25 mg., and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient, as salt | 10 |
| Lactose | 259 |
| Starch | 126 |
| Magnesium stearate | 4 |
| Total | 399 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100 | 250 | 500 |
| Lactose | 214 | 163 | 95 |
| Starch | 87 | 81 | 47 |
| Magnesium stearate | 4 | 6 | 8 |
| Total | 405 | 500 | 650 |

In each case, uniformly blend the selected active ingredient with lactose, starch, and magnesium stearate and encapsulate the blend.

(2) Tablets.—A typical formulation for a tablet containing 10.0 mg. of active ingredient per tablet follows. The formulation may be used for other strengths of active ingredient by adjustment of weight of dicalcium phosphate.

| | Per tablet, mg. |
|---|---|
| (1) Active ingredient | 10.0 |
| (2) Corn starch | 15.0 |
| (3) Corn starch (paste) | 12.0 |
| (4) Lactose | 35.0 |
| (5) Dicalcium phosphate | 132.0 |
| (6) Calcium stearate | 2.0 |
| Total | 206.0 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

(3) Injectable—2% sterile solution:

| | Per cc. |
|---|---|
| Active ingredient mg | 5.0 |
| Preservative, e.g., chlorobutanol, percent weight/volume | 0.5 |
| Water for injection, q.s. | |

Prepare solution, clarify by filtration, fill into vials, seal, and autoclave.

What is claimed is:
1. A compound selected from (a) 5-azaspiro[2.4] heptanes having the formula:

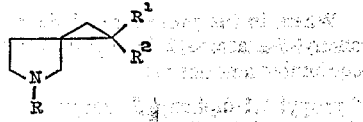

wherein:
R is selected from the group consisting of hydrogen, lower alkyl, 2-hydroxyethyl, phenyl, monosubstituted phenyl and phenyl-lower alkyl,
$R^1$ is selected from the group consisting of hydrogen, phenyl and monosubstituted phenyl,
$R^2$ is selected from the group consisting of phenyl and monosubstituted phenyl,
wherein the substituent in monosubstituted phenyl is selected from lower alkoxy, lower alkyl, trifluoromethyl and halogen radicals, and
(b) non-toxic pharmaceutically acceptable acid addition and quaternary ammonium salts thereof.

2. A compound of claim 1 which is 1,1-diphenyl-5-azaspiro[2.4]heptane.
3. A compound of claim 1 which is 5-methyl-1,1-diphenyl-5-azaspiro[2.4]heptane.
4. A compound of claim 1 which is 5-ethyl-1,1-diphenyl-5-azaspiro[2.4]heptane.
5. A compound of claim 1 which is 5-phenyl-1,1-diphenly-5-azaspiro[2.4]heptane.
6. A compound of claim 1 which is 5-benzyl-1,1-diphenyl-5-azaspiro[2.4]heptane.
7. A compound of claim 1 which is 5-(2-hydroxyethyl-1,1-diphenyl-5-azaspiro[2.4]heptane.

References Cited
UNITED STATES PATENTS
3,432,499  3/1969  Rice et al. _____ 260—247.5

ALEX MAZEL, Primary Examiner

J. A. NARCAVAGE, Assistant Examiner

U.S. Cl. X.R.

260—326.5 FM, 326.8; 424—274